United States Patent [19]

Braig

[11] Patent Number: 4,818,777

[45] Date of Patent: Apr. 4, 1989

[54] PHENOLIC CORROSION INHIBITORS FOR COATING MATERIALS

[75] Inventor: Adalbert Braig, Weil-Friedlingen, Fed. Rep. of Germany

[73] Assignee: Ciba-Geigy Corporation, Ardsley, N.Y.

[21] Appl. No.: 86,338

[22] Filed: Aug. 17, 1987

[30] Foreign Application Priority Data

Aug. 27, 1986 [CH]  Switzerland .......................... 3438/86

[51] Int. Cl.$^4$ ............................ C08K 5/13; C08K 5/15; C04B 9/02; C09D 5/8
[52] U.S. Cl. ................................... 524/83; 106/14.13; 106/14.14; 106/14.16; 106/14.17; 106/14.24; 106/14.37; 252/391; 428/425.8; 428/457; 428/458; 428/461; 428/462; 428/463; 428/464
[58] Field of Search ..................... 252/391, 49.3, 49.5, 252/75, 78.1; 524/83; 428/425.8, 457, 458, 461, 462, 463, 464; 106/14.13, 14.14, 14.16, 14.24, 14.17, 14.37

[56] References Cited

U.S. PATENT DOCUMENTS

| | | | |
|---|---|---|---|
| 3,215,641 | 11/1965 | Rocklin et al. | 252/47.5 |
| 3,219,701 | 11/1965 | O'Shea | 564/300 |
| 3,281,473 | 10/1966 | O'Shea | 568/47 |
| 3,291,841 | 12/1966 | O'Shea | 568/662 |
| 3,310,524 | 3/1967 | Hurlock et al. | 524/83 |
| 4,100,327 | 7/1978 | Smith et al. | 524/83 |
| 4,329,381 | 5/1982 | Eschwey et al. | 427/386 |
| 4,612,049 | 9/1986 | Berner et al. | 524/83 |
| 4,696,763 | 9/1987 | Bentley et al. | 524/83 |
| 4,719,036 | 1/1988 | Clubley et al. | 524/83 |

FOREIGN PATENT DOCUMENTS

| | | | |
|---|---|---|---|
| 161219 | 11/1985 | European Pat. Off. | 524/83 |
| 161222 | 11/1985 | European Pat. Off. | 524/83 |
| 0183647 | 6/1986 | European Pat. Off. | |

OTHER PUBLICATIONS

C. A., 102, 149260s (1985).
C. A. 91, 212415t (1979).
C. A. 98, 145110u (1983).

*Primary Examiner*—Kriellion Morgan
*Attorney, Agent, or Firm*—Luther A. R. Hall

[57] ABSTRACT

Compounds of the formula I

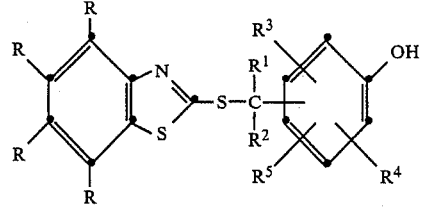

in which is independently hydrogen, alkyl, alkoxy, halogen, trifluoromethyl or nitro, $R^1$ is hydrogen, alkyl, phenyl, substituted phenyl or furyl, $R^2$ is hydrogen or alkyl, $R^3$ and $R^4$ are independently hydrogen, alkyl, allyl, aralkyl, alkoxy, halogen, phenyl or cyclohexyl, and $R^5$ is hydrogen, alkyl or alkenyl, are good corrosion inhibitors for organic materials, especially for coating materials. They can at the same time also act as antioxidants and light stabilizers.

14 Claims, No Drawings

PHENOLIC CORROSION INHIBITORS FOR COATING MATERIALS

The invention relates to coating materials which contain, as corrosion inhibitors, phenolic derivatives of mercaptobenzothiazole.

Mercaptobenzothiazole and its salts are known as corrosion inhibitors, for example from EP-A-3,817. Various derivatives of mercaptobenzothiazole have also been proposed as corrosion inhibitors in the past, for example the benzothiazol-2-ylthiocarboxylic acids and their salts, described in EP-A-129,506. These are predominantly derivatives with hydrophilic groups.

It has now been found that certain benzothiazole derivatives with hydrophobic groups can also be excellent corrosion inhibitors. In addition, these are also active as antioxidants and light stabilizers.

The compounds are distinguished from known corrosion inhibitors based on benzothiazole derivatives by a lower water absorption, by chemical inertness and by their heat-stabilizing action.

These compounds can be used as corrosion inhibitors in all those organic materials which are in contact with metals. This is particularly the case with coating materials.

The invention therefore relates to coating materials which contain, as a corrosion inhibitor, at least one compound of the formula I

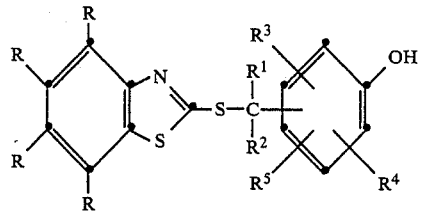

in which each R independently is hydrogen, $C_1$–$C_{12}$-alkyl, $C_1$–$C_4$-halogenoalkyl, $C_1$–$C_{12}$-alkoxy, $C_1$–$C_{12}$-alkylthio, phenylthio, benzylthio, $C_1$–$C_{12}$-alkylsulfonyl, phenyl, $C_7$–$C_{15}$-alkylphenyl, $C_7$–$C_{10}$-phenylalkyl, $C_5$–$C_8$-cycloalkyl, halogen, —$NO_2$, —CN, —COOH, —COO($C_1$–$C_4$-alkyl), —OH, —$NH_2$, —$NHR^6$, —$N(R^6)_2$, —$CONH_2$, —$CONHR^6$ or —$CON(R^6)_2$, $R^1$ is hydrogen, $C_1$–$C_{12}$-alkyl, phenyl or halogen-, $C_1$–$C_4$-alkyl, $C_1$–$C_4$-alkoxy- or —$NO_2$-substituted phenyl, pyridyl, thienyl or furyl, $R^2$ is hydrogen or $C_1$–$C_4$-alkyl, $R^3$ and $R^4$ independently of one another are hydrogen, halogen, $C_1$–$C_4$-alkoxy, cyano, nitro, $C_1$–$C_{20}$-alkyl, —$(CH_2)_m$—$COOR^7$, —$(CH_2)_m$—$CONHR^6$, —$(CH_2)_m$—$CON(R^6)_2$, $C_3$–$C_{20}$-alkenyl, $C_7$–$C_{10}$-phenylalkyl, phenyl, cyclohexyl, cyclopentyl or a group of the formula II

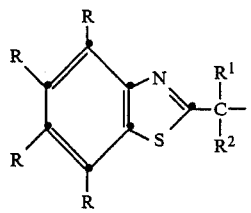

$R^5$ is hydrogen, $C_1$–$C_{20}$-alkyl, $C_3$–$C_{20}$-alkenyl or hydroxyl, or $R^3$ and $R^5$ together or $R^4$ and $R^5$ together form a ring which is fused to the phenol radical and can be a carbocyclic or heterocyclic ring and can contain oxygen, nitrogen or sulfur as the hetero atoms, $R^6$ is $C_1$–$C_{12}$-alkyl, $C_3$–$C_{12}$-alkyl interrupted by one or more O atoms, $C_5$–$C_8$-cycloalkyl, benzyl, phenyl or halogen-, $C_1$–$C_4$-alkyl-, $C_1$–$C_4$-alkoxy- or nitrosubstituted phenyl or —$N(R^6)_2$ is a pyrrolidino, piperidino or morpholino group, $R^7$ is $C_1$–$C_{20}$-alkyl which can be substituted by halogen or hydroxyl, or is $C_3$–$C_{20}$-alkyl which is interrupted by one or more oxygen atoms and can also be substituted by hydroxyl, and m is 0, 1 or 2.

An alkyl radical R, $R^1$, $R^2$, $R^3$, $R^4$, $R^5$, $R^6$ or $R^7$ in formula I can be unbranched or branched alkyl. In the case of $C_1$–$C_4$-alkyl, this can, for example, be methyl, ethyl, n-propyl, isopropyl, n-butyl, sec.-butyl, isobutyl or tert.-butyl. R, $R^1$, $R^3$, $R^4$, $R^5$, $R^6$ and $R^7$ can also be $C_5$–$C_{12}$-alkyl, for example pentyl, hexyl, n-octyl, 2-ethylhexyl, 1,1,3,3-tetramethylbutyl, 1,1,3,3,5,5-hexamethylhexyl, n-decyl, isodecyl or n-dodecyl. $R^3$, $R^4$, $R^5$ and $R^7$ can also be $C_{13}$–$C_{20}$-alkyl, for example tridecyl, tetradecyl, pentadecyl, hexadecyl, octadecyl or eicosyl.

A halogenoalkyl radical R can, for example, be chloromethyl, trichloromethyl, bromomethyl, 2-chloroethyl, 2,2,2-trichloroethyl, trifluoromethyl or 2,3-dichloropropyl.

An alkoxy, alkylthio or alkylsulfonyl radical R can, for example, be methoxy, ethoxy, isopropoxy, butoxy, hexyloxy, octyloxy, dodecyloxy, methylthio, tert.-butylthio, dodecylthio, methylsulfonyl, ethylsulfonyl, hexylsulfonyl or dodecylsulfonyl. An alkylphenyl R can, for example, be tolyl, xylyl, 4-ethylphenyl, 4-tert.-butylphenyl, 4-octylphenyl or 4-nonylphenyl.

A phenylalkyl radical R, $R^3$ and $R^4$ can, for example, be benzyl, 1-phenylethyl, 2-phenylethyl, α,α-dimethylbenzyl or 2-phenylpropyl.

A cycloalkyl radical R and $R^6$ can, for example, be cyclopentyl, cyclohexyl, cycloheptyl, methylcyclohexyl or cyclooctyl.

A halogen-, $C_1$–$C_4$-alkyl-, $C_1$–$C_4$-alkoxy- or nitrosubstituted phenyl radical $R^1$ and $R^6$ can, for example, be 4-chlorophenyl, 3-bromophenyl, 2-fluorophenyl, p-tolyl, 3,5-dimethylphenyl, 4-isopropylphenyl, 4-methoxyphenyl, 3-ethoxyphenyl, 4-nitrophenyl or 4-nitro-2-methylphenyl.

An alkyl radical $R^6$ and $R^7$ interrupted by O can, for example, be 2-methoxyethyl, 2-butoxyethyl, 3,6-dioxaheptyl or 3,6-dioxadecyl. $R^7$ can also be a polyethylene glycol radical having up to 20 carbon atoms and up to 10 oxygen atoms.

$R^3$ and $R^5$ together or $R^4$ and $R^5$ together forming a fused ring are preferably benzene, pyridine or benzofuran ring. Together with the phenol ring, the result is then a naphthol, hydroxyquinoline or dibenzofuran radical.

Those coating materials containing a compound of the formula I are preferred in which one R is hydrogen, $C_1$–$C_4$-alkyl, $C_1$–$C_4$-alkoxy, halogen, trifluoromethyl or nitro and the other three R's are hydrogen.

In addition, those coating materials containing a compound of the formula I are preferred in which $R^1$ is hydrogen, $C_1$–$C_8$-alkyl, phenyl or furyl and $R^2$ is hydrogen, especially a compound of the formula I in which $R^1$ and $R^2$ are hydrogen.

Furthermore, those coating materials containing a compound of the formula I are preferred in which $R^3$ and $R^4$ independently of one another are hydrogen, $C_1$–$C_8$-alkyl, allyl, $C_7$–$C_{10}$-phenylalkyl, $C_1$–$C_4$-alkoxy, halogen, phenyl or cyclohexyl and $R^5$ is hydrogen, $C_1$–$C_{18}$-alkyl or $C_3$–$C_{18}$-alkenyl.

In the formula I, the phenolic OH group preferably is in the para- or ortho-position relative to the group

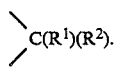

If it is in the para-position, compounds of the formula III are preferred

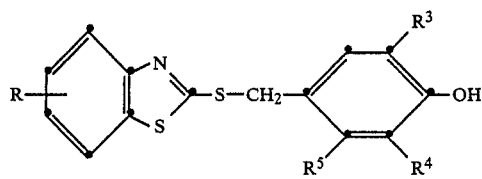

in which R is hydrogen, $C_1$–$C_4$-alkyl, $C_1$–$C_4$-alkoxy, chlorine, trifluoromethyl or nitro, $R^3$ and $R^4$ independently of one another are hydrogen, $C_1$–$C_8$-alkyl, $C_7$–$C_{10}$-phenylalkyl, phenyl or cyclohexyl and $R^5$ is H or $CH_3$.

If the phenolic OH group in the formula I is in the ortho-position, compounds of the formula IV and IVa are preferred.

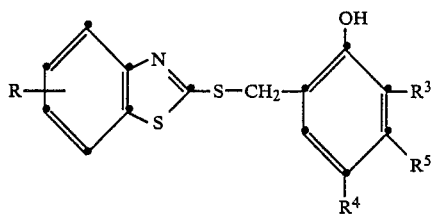

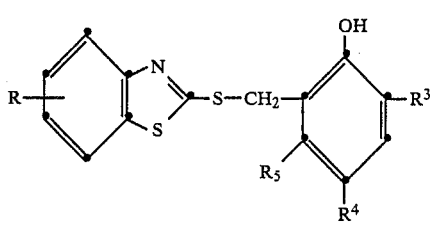

in which R is hydrogen, $C_1$–$C_4$-alkyl, $C_1$–$C_4$-alkoxy, chlorine, trifluoromethyl or nitro, $R^3$ and $R^4$ independently of one another are hydrogen, $C_1$–$C_8$-alkyl, $C_7$–$C_{10}$-phenylalkyl, phenyl, cyclohexyl or a group of the formula IIa

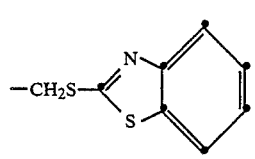

and $R^5$ is hydrogen, $C_1$–$C_{18}$-alkyl or $C_3$–$C_{18}$-alkenyl.

Examples of specific compounds of the formula III are those with the substituents given below:

| Compound No. | R | $R^3$ | $R^4$ | $R^5$ |
|---|---|---|---|---|
| 1 | H | Methyl | t-Butyl | H |
| 2 | H | t-Butyl | t-Butyl | H |
| 3 | H | t-Butyl | Methyl | Methyl |
| 4 | H | Methyl | Cyclohexyl | H |
| 5 | 5-$OC_2H_5$ | t-Butyl | t-Butyl | H |
| 6 | H | Cyclohexyl | Cyclohexyl | H |
| 7 | H | t-Butyl | Cyclohexyl | H |
| 8 | H | Phenyl | Phenyl | H |
| 9 | 5-Cl | 1,1,3,3-Tetramethylbutyl | Methyl | H |
| 10 | H | α,α-Dimethylbenzyl | αα-Dimethylbenzyl | H |
| 11 | H | 1,1,3,3-Tetramethylbutyl | Methyl | Methyl |
| 12 | 6-Cl | 1,1-Dimethylpropyl | 1,1-Dimethylpropyl | H |
| 13 | 6-Cl | t-Butyl | t-Butyl | H |
| 14 | 6-$CF_3$ | t-Butyl | t-Butyl | H |
| 15 | 6-$NO_2$ | t-Butyl | Cyclohexyl | H |
| 16 | H | H | Methyl | Methyl |
| 17 | H | Methyl | H | H |
| 18 | 6-$CH_3$ | H | H | Methyl |

Examples of specific compounds of the formula IV are those with the substituents given below:

| Compound No. | R | $R^3$ | $R^4$ | $R^5$ |
|---|---|---|---|---|
| 20 | H | t-Butyl | Methyl | H |
| 21 | H | t-Butyl | t-Butyl | H |
| 22 | H | | Methyl | H |
| 23 | H | 2-Methylpropyl (Isobutyl) | 1,1-Dimethylpropyl (t-Amyl) | H |
| 24 | H | 1,1-Dimethylpropyl | 1,1-Dimethylpropyl | H |
| 25 | H | 1,1,3,3-Tetramethylbutyl (t-Octyl) | 1,1,3,3-Tetramethylbutyl | H |
| 26 | H | Isopropyl | Isopropyl | H |
| 27 | H | Methyl | Methyl | H |
| 28 | 5-$NO_2$ | α,α-Dimethylbenzyl | Methyl | H |
| 29 | H | H | α,α-Dimethylbenzyl | H |
| 30 | H | H | Nonyl | H |

-continued

| Compound No. | R | $R^3$ | $R^4$ | $R^5$ |
|---|---|---|---|---|
| 31 | H | H | Isopropyl | H |
| 32 | H | H | H | t-Butyl |
| 33 | H | H | H | Pentadecyl |
| 34 | H | H | H | Pentadecenyl |
| 35 | 4-CH$_3$ | Cyclohexyl | Cyclohexyl | H |
| 36 | 5-CH$_3$O | H | Methyl | Methyl |

Examples of compounds of the formula IVa are those with the substituents given below:

| Compound No. | R | $R^3$ | $R^4$ | $R^5$ |
|---|---|---|---|---|
| 37 | H | Isopropyl | H | Methyl |
| 38 | H | Methyl | Methyl | Methyl |
| 39 | 6-Cl | H | Methyl | Methyl |

Some of the compounds of the formula I are known. Thus, U.S. Pat. No. 3,215,641 describes compounds of the formula III as antioxidants for organic materials, for example rubber or lubricating oils. They are prepared from 2-mercaptobenzothiazole and a 4-hydroxymethyl-2,6-dialkylphenol in the presence of acid catalysts. In SU-A-681,075, the compound

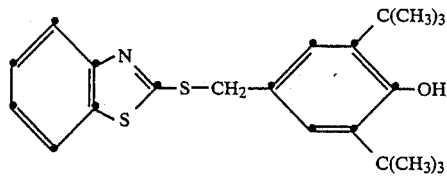

is proposed as a vulcanization accelerator for synthetic rubbers.

U.S. Pat. No. 3,219,701 describes the preparation of compounds of the formula IV from 2-mercaptobenzothiazole, formaldehyde and a 2,4-dialkylphenol. These products are used as intermediates for the preparation of other antioxidants. Such compounds of the formula IV are also used in U.S. Pat. Nos. 3,281,473 and 3,291,841 as intermediates for the preparation of antioxidants. In U.S. Pat. No. 3,310,524, compounds of the formula IV itself are proposed as antioxidants for rubbers, polymers and mineral oils.

The novel compounds of the formula I can also be prepared by these two known preparation methods. The condensation of a 2-mercaptobenzothiazole with a carbonyl compound and a phenol, according to the general reaction equation:

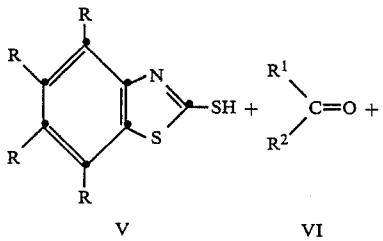

-continued $$\underset{\text{VII}}{\overset{\text{OH}}{\underset{R^5}{\bigodot}}_{R^3}} \overset{}{\underset{}{}} R^4 \longrightarrow I$$

has proved itself particularly as a versatile method. If a 2,6-disubstituted phenol is used, the benzothiazolethioalkyl goes into the 4-position. If a 2,4-disubstituted phenol is used, this radical goes into the 2-position of the phenol. If a 2-substituted phenol and at least 2 equivalents of V and at least 2 equivalents of VI are used, a product can be obtained which carries a radical of the formula II in both the 4-position and 6-position.

The reaction is carried out in the presence of acid catalysts. Preferably, a polar solvent is used, for example a low alcohol (C$_1$-C$_4$), or dimethylformamide or dimethyl sulfoxide.

The compounds of the formula I are effective corrosion inhibitors in organic materials, especially in surface coatings, for example finishes paints or varnishes. They always contain a film-forming binder in addition to other optional components.

Examples of coating materials are those based on an alkyd, acrylic, melamine, polyurethane, epoxide or polyester resin and mixtures of such resins. Further examples of binders are vinyl resins, for example polyvinyl acetate, polyvinyl butyral, polyvinyl chloride and copolymers thereof, cellulose esters, chlorinated rubbers, phenolic resins, styrene/butadiene copolymers and drying oils. Coating materials based on an aromatic epoxide resin are particularly preferred.

The coating materials can contain solvents or be solvent-free, or they can be aqueous systems (dispersions, emulsions, solutions). They can be pigmented or unpigmented, and also metallized. In addition to the corrosion inhibitors according to the invention, they can contain other additives conventional in coating material technology, for example fillers, flow agents, dispersing adjuvants, thioxtropic agents, adhesion promoters, antioxidants, light stabilizers or curing catalysts. They can also contain other known anti-corrosion agents, for example anti-corrosion pigments, such as phosphate- or borate-containing pigments or metal oxide pigments, or other organic or inorganic corrosion inhibitors, for example salts of nitroisophthalic acid, phosphorus-containing esters, technical amines or substituted benzotriazoles.

The addition of basic fillers or pigments, which have a synergistic effect on the corrosion inhibition in certain binder systems, can also be of advantage. Examples of such basic fillers and pigments are calcium or magnesium carbonate, zinc oxide, zinc carbonate, zinc phosphate, magnesium oxide, aluminium oxide, aluminium phosphate or mixtures thereof. Examples of basic organic pigments are those based on aminoanthraquinone.

The corrosion inhibitor can also be applied to a carrier. Pulverulent fillers or pigments are particularly suitable for this purpose. This technique is described in more detail in DE-A-3,122,907.

The corrosion inhibitor can be added to the coating material during its preparation, for example during the pigment dispersion by grinding, or the inhibitor is first dissolved in a solvent and the solution is stirred into the coating agent. The inhibitor is appropriately used in a quantity of 0.1 to 20% by weight, preferably 0.5 to 5% by weight, relative to the solids content of the coating material.

The coating materials are preferably used as primers for metallic substrates, for example for iron, steel, copper, zinc or aluminium. Preferably, the coating materials are used in aqueous systems, especially as cathodic electro-dip coatings.

The coating materials can be applied to the substrate by the conventional methods, for example by spraying, dipping, brushing or by electro-deposition, such as cathodic dip-coating. Frequently, several coats are applied. The corrosion inhibitors are added especially to the undercoat, since they act mainly at the metal/coating boundary. However, the inhibitors can additionally also be incorporated in the top coat or interlayer, where they are available as depot. Depending on whether the binder is a physically drying resin or a heat- or radiation-curable resin, curing takes place at room temperature or by heating (baking) or by irradiation.

On heating of the coating material, an isomerization of the compounds of the formula I to the corresponding 3-hydroxybenzyl-benzothiazole-2-thiones can occur. Since these isomers are likewise good corrosion inhibitors, the effectiveness of the compounds is not impaired by such an isomerization.

It is a particular advantage of the compounds of the formula I that they have a favourable influence on the coating/metal adhesion. In addition, they have an antioxidative and light-stabilizing action on the coating.

In certain cases, it can be advantageous to add a mixture of several compounds of the formula I.

For example when certain technical phenol mixtures are used in the preparation of the compounds of the formula I, a mixture of products of the formula I can inevitably be formed, and this can be used as such. To reduce the melting point, however, it can also be of advantage to mix two or more such compounds.

EXAMPLE

An alkyd resin paint is prepared from the following components:

| | |
|---|---|
| 40 | parts of Alphthalat ® AM 380 (60% solution xylene), alkyd resin from Reichhold Albert Chemie AG |
| 10 | parts of iron oxide red 225 from Bayer AG |
| 13.6 | parts of talc (micronized) |
| 13 | parts of micronized calcium carbonate (Millicarb ®, Pluss-Staufer AG) |
| 0.3 | part of antiskinning agent Luaktin ® (BASF) |
| 0.6 | part of 8% cobalt naphthenate solution |
| 22.5 | parts of 6:40 xylene/ethylglycol mixture. |

The coating material is ground with glass beads down to a pigment and filler particle size of 10–15 μm. The corrosion inhibitors indicated in the tables which follow are added before grinding.

The coating is sprayed onto 7×13 cm sandblasted steel sheets in a layer thickness which gives about 50 μm after drying. After 7 day's drying at room temperature, the samples are finally cured for 60 minutes at 60°.

Using a Bonder crosscut instrument, two crosscuts of 4 cm length down to the metal are made in the cured coated surface. An edge protection agent (Icosit ®255) is applied for protecting the edges.

The samples are then subjected to a salt spray test according to ASTM B 117 for a period of 600 hours. After every 200 hours of weathering, the condition of the coat is assessed, namely the degree of blistering (according to DIN 53 209) at the crosscut and on the coated surface, and the extent of rusting (according to DIN 53 210) on the entire surface.

After the end of the test, the coat is removed by treatment with concentrated caustic soda and the corrosion of the metal at the crosscut (according to DIN 53 167) and over the remaining surface is assessed, in each case according to a 6-stage scale. The sum of the assessment of the coat and the assessment of the metal surface gives the corrosion protection value KS. The higher this value, the more effective is the inhibitor tested.

TABLE 1

| Corrosion inhibitor | Quantity added* | Coat assessment | Metal assessment | KS |
|---|---|---|---|---|
| None | — | 1.6 | 0.6 | 2.2 |
| Compound No. 1 | 2% | 2.9 | 3.6 | 6.2 |
| Compound No. 2 | 2% | 1.9 | 1.7 | 3.6 |
| Compound No. 4 | 2% | 3.9 | 3.9 | 7.8 |
| | 4% | 4.2 | 5.4 | 9.6 |
| Compound No. 5 | 2% | 2.9 | 2.9 | 5.1 |
| Compound No. 6 | 2% | 2.3 | 1.4 | 3.7 |
| Compound No. 7 | 2% | 4.4 | 4.5 | 8.9 |
| Compound No. 13 | 2% | 4.8 | 1.3 | 6.1 |
| Compound No. 14 | 2% | 3.6 | 2.4 | 6.0 |
| Compound No. 20 | 2% | 4.0 | 3.9 | 7.9 |
| | 4% | 5.2 | 3.5 | 8.7 |
| Compound No. 22 | 2% | 3.8 | 1.7 | 5.5 |
| Compound No. 23 | 2% | 3.5 | 2.8 | 6.3 |
| Compound No. 24 | 2% | 2.8 | 2.1 | 4.9 |
| Compound No. 25 | 2% | 2.1 | 1.7 | 3.8 |
| Compound No. 26 | 2% | 3.1 | 2.2 | 5.3 |
| Compound No. 27 | 2% | 2.8 | 1.2 | 4.0 |
| Compound No. 29 | 2% | 3.6 | 5.0 | 8.6 |
| Compound No. 30 | 2% | 3.0 | 1.6 | 4.6 |
| Compound No. 31 | 2% | 4.3 | 4.5 | 8.8 |
| Compound No. 32 | 2% | 4.5 | 4.5 | 9.0 |
| Compound No. 33 | 2% | 3.6 | 4.8 | 8.4 |
| Compound No. 34 | 2% | 4.8 | 4.9 | 9.7 |
| Compound No. 37 | 2% | 3.8 | 5.5 | 9.3 |
| Compound No. 38 | 2% | 3.7 | 3.7 | 7.5 |
| | 4% | 5.1 | 4.4 | 9.5 |

*relative to the solids content of the paint

EXAMPLE 2

Iron sheets are coated with a red alkyd resin paint as described in Example 1. The cured coated surface is provided with a crosscut. The samples are exposed for 18 months to weathering in the open in North Carolina near to the coast under an inclination angle of 45° towards the south. The width of the rust zone along the cut lines is then measured (according to ASTM D 1654-79a).

TABLE 2

| Corrosion inhibitor | Width of rust zone |
|---|---|
| None | 2–5 mm |

TABLE 2-continued

| Corrosion inhibitor | Width of rust zone |
| --- | --- |
| 2% of Compound No. 2 | 0.5–2 mm |

What is claimed is:

1. A coating material containing, as a corrosion inhibitor, at least one compound of the formula I

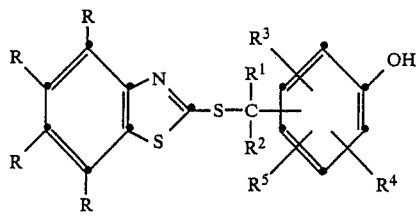

in which each R independently is hydrogen, $C_1$–$C_{12}$-alkyl, $C_1$–$C_4$-halogeno-alkyl, $C_1$–$C_{12}$-alkoxy, $C_1$–$C_{12}$-alkylthio, phenylthio, benzylthio, $C_1$–$C_{12}$-alkylsulfonyl, phenyl, $C_7$–$C_{15}$-alkylphenyl, $C_7$–$C_{10}$-phenylalkyl, $C_5$–$C_8$-cycloalkyl, halogen, —$NO_2$, —CN, —COOH, —COO($C_1$–$C_4$-alkyl), —OH, —$NH_2$, —$NHR^6$, —$N(R^6)_2$, —$CONH_2$, —$CONHR^6$ or —$CON(R^6)_2$, $R^1$ is hydrogen, $C_1$–$C_{12}$-alkyl, phenyl or said phenyl substituted by halogen, by $C_1$–$C_4$-alkyl, by $C_1$–$C_4$-alkoxy or by —$NO_2$;

pyridyl, thienyl or furyl, $R^2$ is hydrogen or $C_1$–$C_4$-alkyl, $R^3$ and $R^4$ independently of one another are hydrogen, halogen, $C_1$–$C_4$-alkoxy, cyano, nitro, $C_1$–$C_{20}$-alkyl, —$(CH_2)_m$-$COOR^7$, —$(CH_2)_m$—$CONHR^6$, —$(CH_2)_m$—$CON(R^6)_2$, $C_3$–$C_{20}$-alkenyl, $C_7$–$C_{10}$-phenylalkyl, phenyl, cyclohexyl, cyclopentyl or a group of the formula II

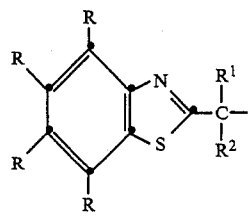

$R^5$ is hydrogen, $C_1$–$C_{20}$-alkyl, $C_3$–$C_{20}$-alkenyl or hydroxyl, or $R^3$ and $R^5$ together or $R^4$ and $R^5$ together form a ring which is fused to the phenol radical and can be a carbocyclic or heterocyclic ring and can contain oxygen, nitrogen or sulfur as hetero atoms, $R^6$ is $C_1$–$C_{12}$-alkyl, $C_3$–$C_{12}$-alkyl interrupted by one or more O atoms, $C_5$–$C_8$-cycloalkyl, benzyl, phenyl or said phenyl substituted by halogen, by $C_1$–$C_4$-alkyl, by $C_1$–$C_4$-alkoxy or by nitro; or —$N(R^6)_2$ is a pyrrolidino, piperidino or morpholino group, $R^7$ is $C_1$–$C_{20}$-alkyl which can be substituted by halogen or hydroxyl, or is $C_3$–$C_{20}$-alkyl which is interrupted by one or more oxygen atoms and can also be substituted by hydroxyl, and m is 0, 1 or 2.

2. A coating material according to claim 1, wherein, in the formula I, one R is hydrogen, $C_1$–$C_4$-alkyl, $C_1$–$C_4$-alkoxy, halogen, trifluoromethyl or nitro and the other three R's are hydrogen.

3. A coating material according to claim 1, wherein, in the formula I, $R^1$ is hydrogen, $C_1$–$C_8$-alkyl, phenyl or furyl and $R^2$ is hydrogen.

4. A coating material according to claim 1, wherein, in the formula I, $R^1$ and $R^2$ are hydrogen.

5. A coating material according to claim 1, wherein, in the formula I, $R^3$ and $R^4$ independently of one another are hydrogen, $C_1$–$C_8$-alkyl, allyl, $C_7$–$C_{10}$-phenylalkyl, $C_1$–$C_4$-alkoxy, halogen, phenyl or cyclohexyl and $R^5$ is hydrogen, $C_1$–$C_{18}$-alkyl or $C_3$–$C_{18}$-alkenyl.

6. A coating material according to claim 1, containing a compound of the formula III

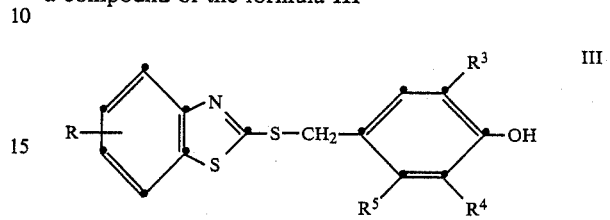

in which R is hydrogen, $C_1$–$C_4$-alkyl, $C_1$–$C_4$-alkoxy, chlorine, trifluoromethyl or nitro, $R^3$ and $R^4$ independently of one another are hydrogen, $C_1$–$C_8$-alkyl, $C_7$–$C_{10}$-phenylalkyl, phenyl or cyclohexyl and $R^5$ is hydrogen or methyl.

7. A coating material according to claim 1, containing a compound of the formula IV or IVa

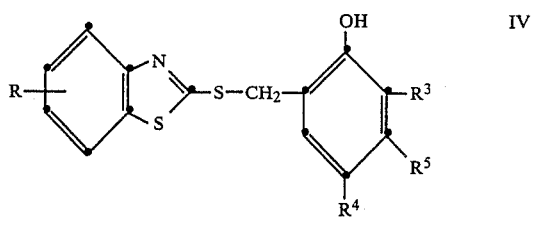

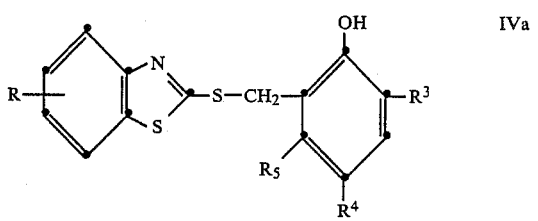

in which R is hydrogen, $C_1$–$C_4$-alkyl, $C_1$–$C_4$-alkoxy, chlorine, trifluoromethyl or nitro, $R^3$ and $R^4$ independently of one another are hydrogen, $C_1$–$C_8$-alkyl, $C_7$–$C_{10}$-phenylalkyl, phenyl, cyclohexyl or a group of the formula IIa

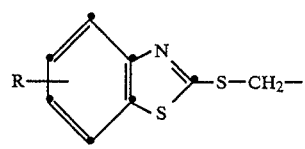

and $R^5$ is hydrogen, $C_1$–$C_{18}$-alkyl or $C_3$–$C_{18}$-alkenyl.

8. A coating material according to claim 1, based on an alkyd, acrylic, melamine, polyurethane, epoxide or polyester resin or a mixture of such resins.

9. A coating material according to claim 1, based on an aromatic epoxide resin.

10. A coating material according to claim 1, as a primer for metallic substrates.

11. A primer according to claim 9 for substrates of iron, steel, copper, zinc or aluminium.

12. A coating material according to claim 1 for aqueous paint systems.

13. A coating material according to claim 11, which is a cathodic electro-dip coating material.

14. A coating material according to claim 12, containing 0.5 to 5% by weight, relative to the solids content of the paint, of at least one compound of the formula I as a corrosion inhibitor.

* * * * *